United States Patent
Futai et al.

(10) Patent No.: US 10,131,310 B2
(45) Date of Patent: Nov. 20, 2018

(54) SIDE AIRBAG DEVICE FOR VEHICLE

(71) Applicant: MITSUBISHI JIDOSHA KOGYO KABUSHIKI KAISHA, Minato-ku, Tokyo (JP)

(72) Inventors: Takaaki Futai, Tokyo (JP); Naoki Fujisawa, Tokyo (JP); Shinya Nakamura, Tokyo (JP); Hiroyuki Suzuki, Tokyo (JP); Toshihide Nishimura, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 73 days.

(21) Appl. No.: 15/262,887

(22) Filed: Sep. 12, 2016

(65) Prior Publication Data

US 2016/0375851 A1    Dec. 29, 2016

Related U.S. Application Data

(63) Continuation of application No. PCT/JP2015/057159, filed on Mar. 11, 2015.

(30) Foreign Application Priority Data

Mar. 13, 2014 (JP) ................................ 2014-050484

(51) Int. Cl.
*B60R 21/207* (2006.01)
*B60R 21/2338* (2011.01)
(Continued)

(52) U.S. Cl.
CPC .......... *B60R 21/207* (2013.01); *B60R 21/233* (2013.01); *B60R 21/2338* (2013.01);
(Continued)

(58) Field of Classification Search
CPC ................ B60R 21/207; B60R 21/237; B60R 21/23138; B60R 21/233; B60R 21/2338;
(Continued)

(56) References Cited

U.S. PATENT DOCUMENTS 5,845,935 A * 12/1998 Enders .............. B60R 21/23138
280/730.1
6,059,312 A * 5/2000 Staub .................... B60R 21/233
280/729

(Continued)

FOREIGN PATENT DOCUMENTS

DE    10 2008 028 389 A1    12/2009
EP    1 595 751 A1    11/2005

(Continued)

OTHER PUBLICATIONS

Extended European Search Report issued in the corresponding EP Application No. 15761747.3 dated Oct. 9, 2017.

*Primary Examiner* — Darlene P Condra
(74) *Attorney, Agent, or Firm* — Birch Stewart Kolasch & Birch, LLP

(57) ABSTRACT

A seat provided in a vehicle interior of the vehicle; a side airbag having a plurality of chambers each folded, the side airbag being stored in a side portion of a seat back; an inflator arranged together with the side airbag, the inflator suppling gas to the plurality of chambers when a side-impact crash of the vehicle is detected; a channel section for distributing the gas generated from the inflator to the plurality of chambers; a valve unit provided in the channel section, the valve unit reducing the distributed amount of the gas flowing from the channel section to a particular chamber among the plurality of chambers; and an actuator unit that allows the valve unit to operate to reduce the distributed amount of the gas flowing from the channel section to the (Continued)

particular chamber according to the deployment behavior of any chamber among the plurality of chambers, are included.

17 Claims, 8 Drawing Sheets

(51) Int. Cl.
    *B60R 21/2346* (2011.01)
    *B60R 21/233* (2006.01)
    *B60R 21/231* (2011.01)
    *B60R 21/237* (2006.01)

(52) U.S. Cl.
    CPC .... *B60R 21/2346* (2013.01); *B60R 21/23138* (2013.01); *B60R 21/237* (2013.01); *B60R 2021/23146* (2013.01); *B60R 2021/23384* (2013.01)

(58) Field of Classification Search
    CPC ...... B60R 21/2346; B60R 2021/23384; B60R 2021/23146
    See application file for complete search history.

(56) References Cited

U.S. PATENT DOCUMENTS

| | | | |
|---|---|---|---|
| 6,086,092 A * | 7/2000 | Hill | B60R 21/233 280/729 |
| 7,922,191 B2 * | 4/2011 | Choi | B60R 21/233 280/729 |
| 8,020,892 B2 | 9/2011 | Choi | |
| 8,596,678 B2 * | 12/2013 | Ravenberg | B60R 21/23138 280/729 |
| 8,657,330 B1 * | 2/2014 | Choi | B60R 21/233 280/730.2 |
| 9,150,185 B2 * | 10/2015 | Hotta | B60R 21/23138 |
| 9,321,425 B2 * | 4/2016 | Charpentier | B60R 21/233 |
| 2002/0038949 A1 | 4/2002 | Okada et al. | |
| 2006/0071461 A1 | 4/2006 | Williams et al. | |
| 2006/0175809 A1 * | 8/2006 | Yamaji | B60R 21/23138 280/729 |
| 2011/0079991 A1 * | 4/2011 | Ravenberg | B60R 21/23138 280/740 |
| 2011/0285119 A1 | 11/2011 | Yamamoto et al. | |
| 2011/0268201 A1 | 12/2011 | Kobayashi et al. | |
| 2012/0043741 A1 * | 2/2012 | Yamamoto | B60R 21/23138 280/730.2 |
| 2012/0049494 A1 | 3/2012 | Yamamoto | |
| 2012/0200072 A1 * | 8/2012 | Fukawatase | B60R 21/23138 280/741 |
| 2015/0042082 A1 | 2/2015 | Koshikawa et al. | |

FOREIGN PATENT DOCUMENTS

| | | |
|---|---|---|
| EP | 2 463 159 A1 | 6/2012 |
| JP | 2007-83835 A | 4/2007 |
| JP | 2008-515716 A | 5/2008 |
| JP | 2010-184595 A | 8/2010 |
| JP | 2010-184640 A | 8/2010 |
| JP | 2010-269646 A | 12/2010 |
| JP | 2013-203168 A | 10/2013 |

* cited by examiner

SIDE AIRBAG DEVICE FOR VEHICLE

CROSS REFERENCE TO RELATED APPLICATIONS

This application is a Continuation of PCT International Application No. PCT/JP2015/057159, filed on Mar. 11, 2015, which claims priority under 35 U.S.C. 119(a) to Patent Application No. 2014-050484, filed in Japan on Mar. 13, 2014, all of which are hereby expressly incorporated by reference into the present application.

BACKGROUND OF THE INVENTION

Technical Field

The present invention relates to a side airbag device for a vehicle, which allows a side airbag to deploy on a side part of a seated occupant.

Related Art

An automobile (vehicle) may be provided with a side airbag device for protecting a seated occupant from an impact at the time of a side-impact crash of the vehicle.

Many side airbag devices for a vehicle use a structure in which an inflator and a side airbag are stored in a side portion of a seat back constituting a seat. When a side-impact crash occurs, a folded side airbag moves toward the front of the seat while being expanded by the gas generated by the inflator, and deploys at a side part of the occupant.

Some side airbags are configured to include a plurality of chambers such as a chamber that deploys beside the shoulder and the chest of an occupant and a chamber that deploys beside the lower back of the occupant.

Meanwhile, as the shoulder and lower back of the occupant are wider than the other regions of the body, the spaces between such regions and the inner surface of the door tend to be narrower than that of the other regions of the body. As such, chambers are required to deploy earlier in such regions.

In order to realize early deployment of a plurality of chambers, as disclosed in Japanese Patent Laid-Open No. 2010-184595, a technology has been proposed in which a channel section, allowing an upper chamber and a lower chamber to communicate with each other, is provided to distribute gas generated by an inflator into a plurality of chambers via the channel section.

However, the plurality of chambers each have different internal capacities (chamber capacity, because the outer shapes are different). As such, the time taken for completely deploying the chamber differs from each other.

In view of the above, as disclosed in Japanese Patent Laid-Open No. 2010-184640, another technology has also been proposed in which when a particular chamber is filled with gas pressure due to distribution to a plurality of chambers, the pressure in such a chamber prevents the gas from flowing into a particular chamber whereby the gas is led to the chambers other than the particular chamber.

Meanwhile, as a space between a seat side part and an inner surface of the door differs by each vehicle model, for example, a side airbag is required to have a deployment characteristic suitable for each vehicle model, in addition to early deployment.

SUMMARY OF THE INVENTION

In view of the above, an object of the present invention is to provide a side airbag for a vehicle, which enables early deployment of a plurality of chambers respectively and enables a deployment characteristic of a particular chamber to be changed.

A side airbag device for a vehicle, according to the present invention, is configured to include a seat provided in a vehicle interior of the vehicle; a side airbag having a plurality of chambers each folded, the side airbag being stored in a side portion of the seat back of the seat; an inflator arranged together with the side airbag, the inflator being capable of suppling gas to the plurality of chambers when a side-impact crash of the vehicle is detected; a channel section for distributing the gas generated from the inflator to the plurality of chambers; a valve unit provided in the channel section, the valve unit being capable of reducing the distributed amount of the gas flowing from the channel section to a particular chamber among the plurality of chambers; and an actuator unit that allows the valve unit to operate to reduce the distributed amount of the gas flowing from the channel section to the particular chamber according to the deployment behavior of any chamber among the plurality of chambers.

According to a side airbag device for a vehicle of the present invention, the gas generated from the inflator is distributed to a plurality of chambers through a channel section. Further, the amount of the gas distributed to a particular chamber is controlled by a valve unit, based on the deployment behavior of a chamber.

As such, it is possible not only to deploy the entire airbag early, but also to change the deployment characteristic of the particular chamber with use of the deployment behavior of a chamber.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, the present invention will be described based on a first embodiment shown in FIGS. 1 to 6B.

Figure 1:
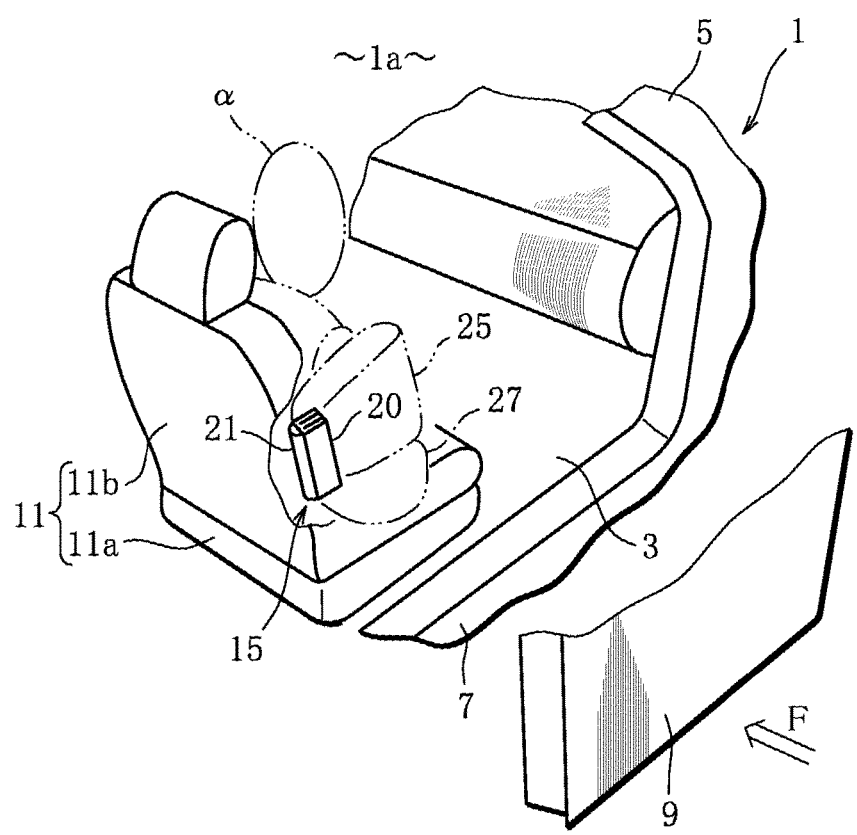
FIG. 1 is a perspective view showing a vehicle provided with a side airbag device which is an aspect according to a first embodiment of the present invention.

FIG. 1 shows a part of a vehicle (for example, automobile) to which the present invention is applied. In FIG. 1, a reference numeral 1 denotes a vehicle body having a vehicle interior 1a therein, and a reference numeral 3 denotes an entrance on the front side (the driver's seat side in this example) provided on a side part in the vehicle width direction of the vehicle body 1. The entrance 3 on the front side is formed of an opening surrounded by a front pillar 5, a side roof rail (not shown), a center pillar (not shown), a side sill 7, and the like. The entrance 3 is provided with a horizontally-openable front door 9. These respective parts constitute a side part (vehicle width direction) of the vehicle interior 1a.

The vehicle interior 1a is provided with a front seat 11 (corresponding to a seat of the present application) adjacent to the front door 9. On the front seat 11, an occupant α sits. The front seat 11 is configured to include a seat cushion 11a on which the occupant α sits, and a seat back 11b for supporting the back of the occupant α.

Figure 2:
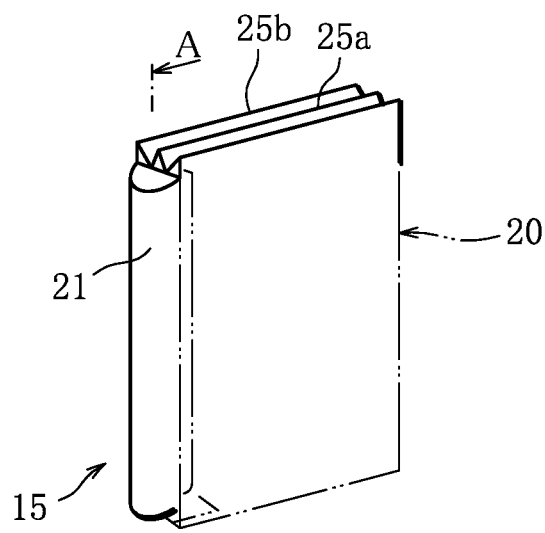
FIG. 2 is a perspective view showing the side airbag device in FIG. 1 by enlarging it.

In the front seat 11, a side airbag device 15 is installed in a side portion on the door side of the seat back 11b. The side airbag device 15 is configured of a folded side airbag 20 made of cloth, an inflator 21 for deploying the side airbag 20 by the generated gas, and the like, which are shown in FIG. 2 in an enlarged manner. The side airbag device 15 is mounted on the seat frame (not shown) constituting the seat back 11b, for example, with the airbag deploying side thereof facing the front of the seat.

Figure 3:
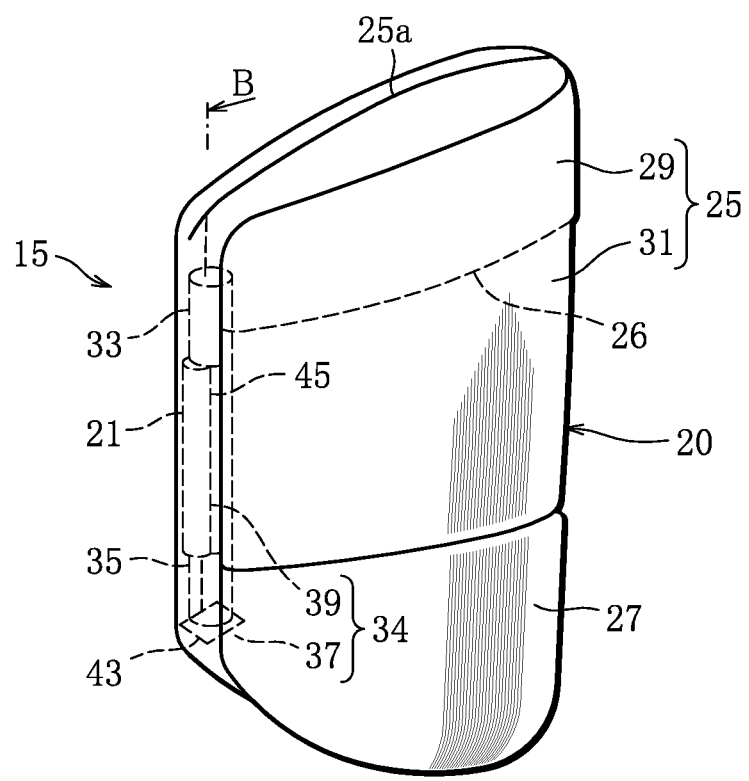
FIG. 3 is a perspective view showing a deployed side airbag.
Figure 4:
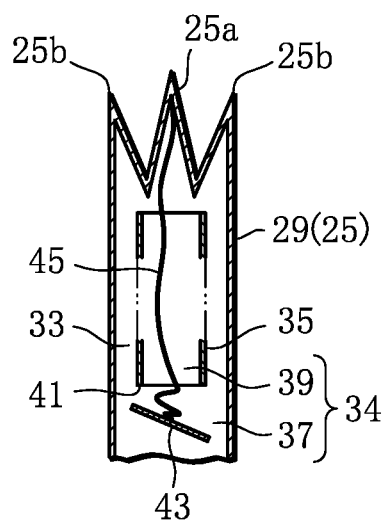
FIG. 4 is a sectional view showing an upper end inner portion of the side airbag, taken along the line A in FIG. 2.

The side airbag 20 is configured to include chambers capable of deploying toward the front of the seat. Specifically, the side airbag 20 includes an upper chamber 25 (corresponding to another chamber of the present application) capable of deploying between the shoulder, chest, and abdomen of the occupant α seated on the front seat 11, as shown in FIGS. 1 and 3, and the inner surface (corresponding to a side part of the vehicle interior 1a) of the front door 9, and a lower chamber 27 (corresponding to a particular chamber of the present application) capable of deploying between the lower back of the occupant α for example, which is the front of the seat, and the inner surface (corresponding to a side part of the vehicle interior 1a) of the front door 9. The upper chamber 25 and the lower chamber 27 are partitioned vertically. Among them, the upper chamber 25 is sectioned into upper and lower portions via a ventilation section 26, in which the upper portion forms a chamber portion 29 corresponding to the shoulder and the lower portion forms a chamber portion 31 corresponding to the chest. The capacity of the upper chamber 25 (chamber capacity) is the same as or larger than the capacity (chamber capacity) of the lower chamber 27. In this example, the capacity of the upper chamber 25 is larger than the capacity of the lower chamber 27. The side airbag 20 is folded in a deployable manner. In this example, regarding an upper end portion of the circumference of the upper chamber 25 having a larger capacity, a folded portion 25a in a range having an almost W-shape cross section from starting points 25b on both sides, which are starting points of tuck folding, is folded inside (to the inner side) of the upper chamber 25, as shown in FIG. 4, for example. It should be noted that the folded portion 25a may be valley-folded.

The side airbag 20 has a structure with which the upper chamber 25 and the lower chamber 27 can deploy early and the deployment characteristic of the lower chamber 27, serving as a particular chamber, is controllable. The structures of the respective portions are shown in FIGS. 3 to 6B.

The structure is a structure in which a distribution structure 33 for distributing gas generated from the inflator 21 to the upper chamber 25 and the lower chamber 27 with use of an inner tube 35 which is a channel section as shown in FIGS. 3 to 6A, and a control structure 34 for controlling the distribution amount of the lower chamber 27 based on the deployment behavior of a chamber other than a particular chamber, namely the upper chamber 25 in this example, are combined.

Figure 6A:
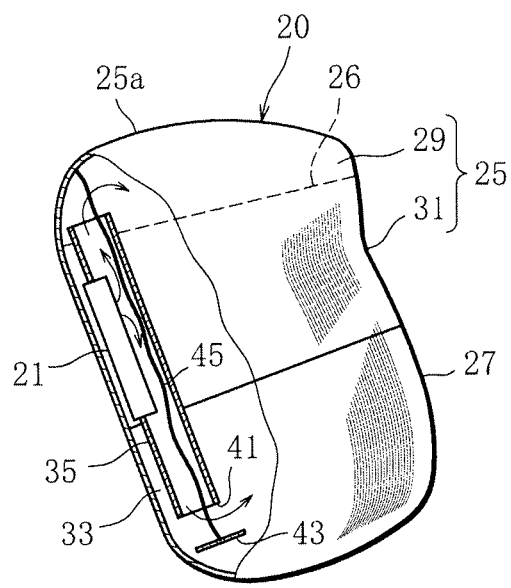
FIG. 6A is a side view of the side airbag in which a part thereof is cross-sectioned, explaining a state where the side airbag is deploying.

Among them, as the distribution structure 33, a structure of attaching the inner tube 35 made of cloth, which is deployable in a cylindrical shape, to the base end side inside the side airbag 20 as shown in FIGS. 3 and 6a, is used, for example. This means that the upper end portion of the inner tube 35 penetrates through the ventilation section 26 to extend to the chamber portion 29 (upper chamber 25) arranged at the shoulder region, and the upper end opening opens to the inside of the chamber portion 29. Further, the lower end portion of the inner tube 35 extends to the lower chamber 27 arranged at the lower back region, and the lower end opening opens to the inside of the lower chamber 27. The inflator 21, which should be arranged together with the side airbag 20, is disposed at a portion of the inner tube 35, for example, so as to allow the gas from the inflator 21 to be directed to the upper and lower ends of the inner tube 35. As such, it is configured such that the gas generated from the inflator 21 is distributed to the plurality of chambers, namely the upper chamber 25 having a larger capacity and the lower chamber 27 having a smaller capacity, through the inner tube 35.

The control structure 34 is configured such that a valve structure is provided to the lower end portion of the inner tube 35 as shown in FIGS. 3 and 6A, for example. As the valve structure, a structure of realizing a closing operation with use of the deployment behavior of the chamber portion 29 (upper chamber 25) is used. The valve structure is configured such that a valve unit 37 provided to the lower end portion (end portion on the lower chamber 27 side) of the inner tube 35, for example, and an actuator unit 39 that controls the closing operation of the valve unit 37 by the deployment behavior of the chamber portion 29 (upper chamber 25) are combined.

For example, the valve unit 37 has a structure in which a valve seat 41 formed at an outlet in the lower portion of the inner tube 35 (outlet opening to the chamber of a smaller capacity) and a valve body member with which the valve seat 41 is closable, namely a tabular valve body member 43 independent of the inner tube 35 in this example, are combined. Although not shown, the valve seat 41 is configured to be in a structure of applying an annular rigid member (not shown) to the opening edge of the lower portion of the inner tube 35.

Figure 5:
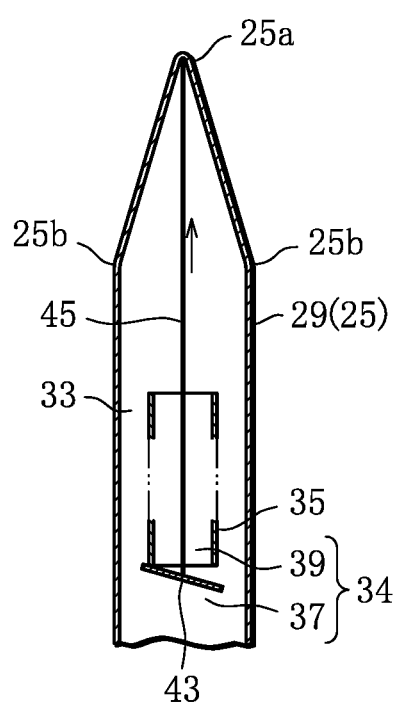
FIG. 5 is a sectional view showing an upper end inner portion of the side airbag, taken along the line B in FIG. 3.

As the actuator unit 39, a cord-like member inserted in the inner tube 35, for example, as shown in FIGS. 3 to 5, namely a strap 45, for example, is used. The upper end portion (one end portion) of the strap 45 is connected with the upper end portion of the circumference of the chamber portion 29, for example, which is a part of the circumference of the upper chamber 25. Specifically, it is connected with the inner surface of the folded portion 25a which is tuck-folded. The folded portion 25a is used as a portion to which the strap 45 is connected, if it is within a range (part) to be displaced by expansion deployment, although there is a difference in the amount of displacement by the expansion deployment of the upper chamber 25. Further, the lower end portion (the other end) of the strap 45 is connected with the center portion of the valve body member 43, for example. This means that the upper end portion (one end portion) of the strap 45 extending from the valve body member 43 travels from the valve seat 41 to the inside of the inner tube 35, passes through the vicinity of the inflator 21, goes out of the inner tube 35 and arrives at the upper end portion of the circumference of the chamber portion 29. With this strap 45, the valve body member 43 is displaceable to the closing side, that is, a direction approaching the valve seat 41, according to the progress of deployment of the chamber portion 29 (upper chamber 25). With the displacement to the closing side of the valve body member 43, the amount of gas to be distributed to the lower chamber 27, facing the upper chamber 25, is reduced.

This means that the gas amount distributed to the lower chamber 27, which is a particular chamber, is controlled by the control amount of the valve body member 43 based on the deployment behavior of the upper chamber 25 which is a chamber other than the particular chamber. The control amount of the valve body member 43 can be set by selecting the length size of the strap 45. In particular, in a state where the upper chamber 25 is in expansion deployment, the strap 45 is set to be held in a tension state which is a state where the strap 45 is pulled with tension. As such, the deployment characteristic of the lower chamber 27 is variable in various ways according to the setting of the length size of the strap 45. In this example, the strap 45 has a length size such that the valve seat 41 is opened in the initial stage of the deployment of the upper chamber 25, and in the latter stage of the deployment of the upper chamber 25, that is, when the chamber portion 29 finished deployment, for example, the valve seat 41 is closed.

Such a valve structure not only enables early deployment of the upper and lower chambers 25 and 27 but also allows the deployment characteristic of the lower chamber 27 to be changed.

This point will be described with reference to FIGS. 6A and 6B. It is assumed that a side-impact crash has occurred at the front door 9 of the vehicle as shown by a reference character F (force) in FIG. 1, which is detected by a collision sensor not shown, for example.

In that case, gas is generated from the inflator 21. Then, as shown in FIG. 6A, the gas generated from the inflator 21 passes through the inner tube 35, and is ejected from the upper and lower ends of the inner tube 35 to the chamber portion 29 and the lower chamber 27. When the gas flows in, the upper and lower chambers 25 and 27 start expanding, and start deployment from a side airbag derivation portion (not shown) formed in the seat back 11b, toward the front of the seat.

In the initial stage of deployment of the side airbag 20, no tension is applied to the strap 45. This means that the lower end of the inner tube 35 is in a release state. Thereby, as shown in FIG. 6A, the gas generated from the inflator 21 is distributed to the chamber portion 29 and the lower chamber 27 almost equally through the inner tube 35, from the initial stage of deployment. With such distribution, deployment is started preferentially in parts corresponding to the positions of the narrow spaces between the shoulder and lower back of the occupant α and the inner surface of the door.

This means that the chamber portion 29 starts deployment between the shoulder of the occupant α and the inner surface of the door, and the lower chamber 27 starts deployment between the lower back of the occupant α and the inner surface of the door (FIG. 1). Thereby, as shown in FIG. 5, the folded portion 25a of the chamber portion 29 forming a portion arranged above the tuck-folded starting point 25b is displaced from a position in a folded state to start deployment upward progressively. With this behavior, when a pulling-up tension is applied to the strap 45 along with deployment displacement of the chamber portion 29 and the folded portion 25a thereof, the strap 45 is pulled upward progressively. Thereby, the valve body member 43 is getting close to the valve seat 41.

Figure 6B:
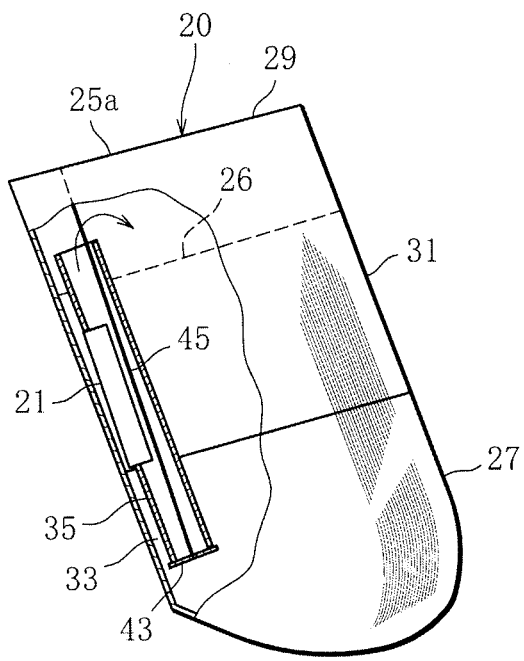
FIG. 6B is a side view of the side airbag in which a part thereof is cross-sectioned, explaining a state where deployment of the side airbag ends.

As shown in FIG. 6B, when the deployment of the chamber portion 29 progresses and deployment at the folded portion 25a is finished and the folded portion 25a becomes a part constituting the upper end face of the circumference of the chamber portion 29 after the expansion deployment, the valve body member 43 reaches the valve seat 41 to close the opening of the valve seat 41. The valve body member 43 keeps the closed state due to the tension (tension state) caused in the strap 45. Thereby, ejection of the gas from the valve seat 41 is regulated, so that deployment of the lower chamber 27 having a smaller capacity ends.

Then, the amount of gas flowing to the upper chamber 25 of a larger capacity increases by the amount of gas toward the lower chamber 27, accelerating the deployment speed of the upper chamber 25. With the increased amount of gas, deployment of the chamber portion 31 is performed. This means that the upper chamber 25 having a larger capacity deploys together with the lower chamber 27 efficiently and in an earlier stage.

At this time, by using the side airbag 20 in which the length size of the strap 45 is set to be longer than the above-described strap length, the lower chamber 27 can have a characteristic of deploying with a smaller amount of gas, rather than deploying with a sufficient amount of the gas generated.

Thereby, as for the lower chamber 27, a deployment characteristic suitable for a vehicle model having a different amount of space between an occupant and the inner surface of the door is set. It should be noted that setting of a length size of the strap 45 includes a state where only the amount of gas flowing from the valve seat 41 is suppressed, without closing the valve seat 41 with the valve body member 43.

As described above, by distributing the gas generated from the inflator 21 to the respective chambers 25 and 27 using the inner tube 35 and the valve structure, it is possible to allow the entire airbag to deploy early. Further, it is also possible to change the deployment characteristic of a particular chamber.

Further, with the structure using the strap 45 which is a cord-like member, it is only necessary to connect, by the strap 45, the valve body member 43 for closing the lower chamber 27 serving as a particular chamber among the plurality of chambers, and the circumference of another chamber, that is, the upper chamber 25 serving as a chamber other than the particular chamber in this example. As such, only a simple structure is enough.

Then, by distributing the generated gas to the upper chamber 25 (larger capacity) and the lower chamber 27 (smaller capacity) having different capacities, and, according to the deployment behavior of the upper chamber 25, controlling the distributed amount of the gas to the opposite lower chamber 27 having a smaller capacity, it is possible not only to deploy the upper chamber 25 early but also change the deployment characteristic of the lower chamber 27 (chamber of a smaller capacity). Accordingly, the present invention is suitable for a side airbag device having a plurality of chambers of different capacities.

Further, as the strap 45 is inserted in the inner tube 35, it is less likely that displacement of the strap 45 and displacement of each chamber, other than the part to which an end of the strap 45 is connected, interfere with each other. As such, application of unintentional tension to the strap 45 can be suppressed.

In particular, by adopting a structure of connecting the strap 45 to the folded portion 25a of the upper chamber 25 which is tuck-folded or valley-folded, it is easy to change the deployment characteristic of the lower chamber 27.

It should be noted that even in the case where the capacities of the respective chambers 25 and 27 are opposite or the capacities are the same, a similar effect can be achieved.

FIGS. 7A to 8B show a second embodiment of the present invention.

The present embodiment is a modification of the first embodiment, using a valve body member integrated with an inner tube, rather than a valve body member independent of an inner tube.

Figure 7A:
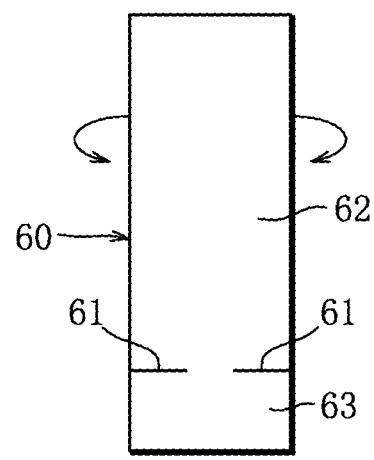
FIG. 7A is a deployment view of a different channel section and a valve unit, which is an aspect of a second embodiment of the present invention.
Figure 7B:
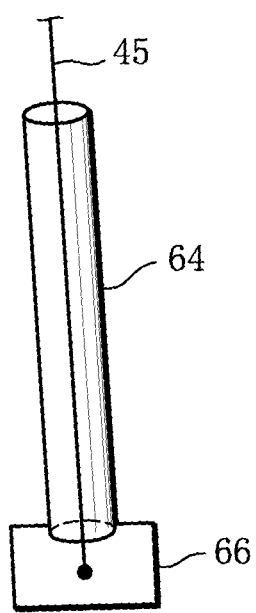
FIG. 7B is a perspective view showing an external appearance of the channel section and the valve unit formed by the deployment view.

Specifically, as shown in FIG. 7A, small cuts 61 are made on both sides of one end portion of a belt-like cloth piece 60, for example, and a center portion 62 of the cloth piece 60 is wound in a cylindrical shape as shown by the arrows to form an inner tube 64 as shown in FIG. 7B, and the other end portion 63 of the cloth piece 60 is used as a hinge without the small cut 61 to form a valve body member 66 for opening and closing an end of the inner tube 64. Then, similar to the case of the first embodiment, an end of the strap 45 is connected to the valve body member 66.

Figure 8A:
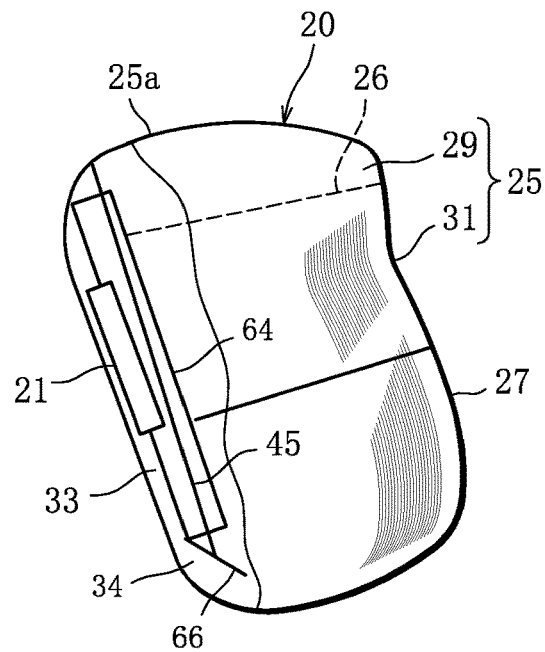
FIG. 8A is a side view of a side airbag in which a part thereof is cross sectioned, explaining a state where the side airbag is deploying with use of the channel section and a valve member.
Figure 8B:
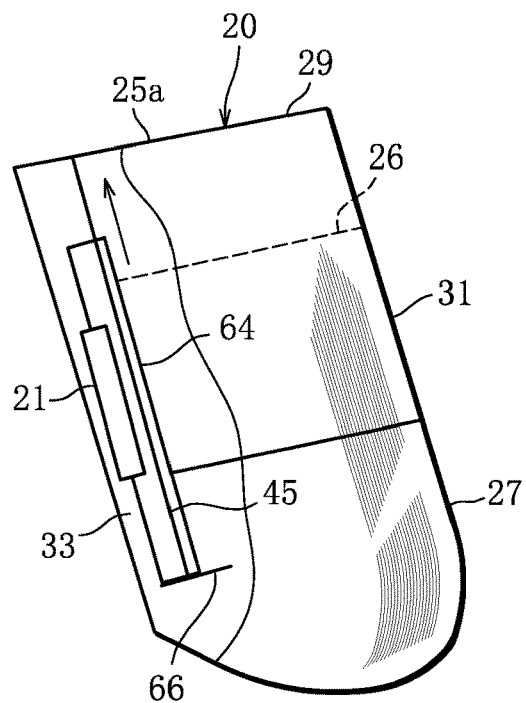
FIG. 8B is a side view of the side airbag in which a part thereof is cross sectioned, explaining a state where deployment of the side airbag ends with use of the channel section and the valve member.

Thereby, as shown in FIGS. 8A and 8B, the valve body member 66 is displaced to the closing side along with the progress of deployment of the upper chamber 25.

Even with such a valve structure, an effect similar to that of the first embodiment is achieved.

Figure 9:
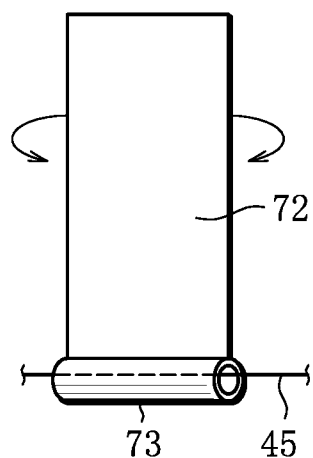
FIG. 9 is a deployment view of a different channel section and a throttle section, which is an aspect according to a third embodiment of the present invention.
Figure 10A:
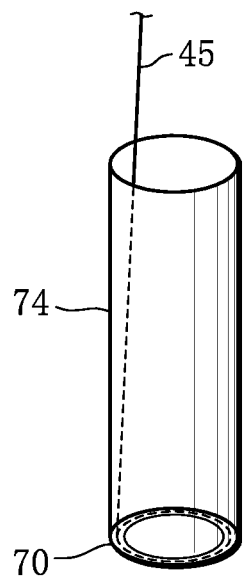
FIG. 10A is a perspective view explaining the channel section formed by the deployment view.
Figure 10B:
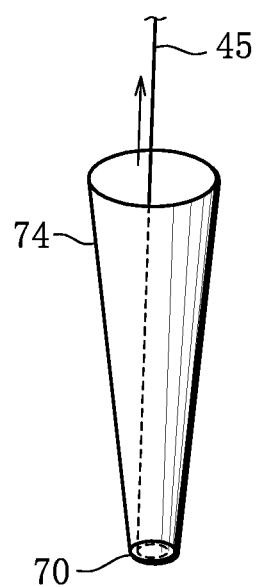
FIG. 10B is a perspective view explaining a throttling operation of the throttle section formed by the deployment view.

FIGS. 9, 10A and 10B show a third embodiment of the present invention.

The present embodiment is a modification of the first and second embodiments, using a throttle section 70, rather than a valve body member, as the valve unit 37 at an end of an inner tube.

Specifically, as shown in FIG. 9, in the throttle section 70, one end of a belt-like cloth piece 72 is wound to form a strap passage section 73, the cloth piece 72 is wound in the direction of the arrow in a cylindrical shape together with the strap passage section 73 to form an inner tube 74 as shown in FIG. 10A, and the strap 45 is inserted in the strap passage section 73 and is linked to the end portion so as to allow it to be displaced to the throttle side.

Thereby, similar to the case of the first embodiment, according to the progress of deployment of the upper chamber 25, when the strap 45 is pulled up, the throttle section 70 is throttled as shown in FIG. 10B, and the amount of gas flowing out to the lower chamber 27 is regulated.

Even with such a valve structure, an effect similar to that of the first embodiment is achieved.

In the second and third embodiments, the same parts as those in the first embodiment are denoted by the same reference numerals and the description thereof is omitted.

It should be noted that the respective configurations and combinations thereof are examples in the embodiments described above. It is needless to say that addition, omission, replacement, and other changes can be made within the scope not deviating from the spirit of the present invention. In the embodiments described above, for example, the amount of gas flowing into a particular chamber (chamber of smaller capacity) is controlled based on the deployment behavior of the other chamber (chamber of a larger capacity) by an actuator unit using a strap, a valve body member, or a throttle section, it is possible to configure a side airbag device in which the amount of gas is controlled by an actuator unit using components other than these. Further, a part to which one end portion of a strap is connected may be the circumference of any of the plurality of chambers, if it is a part displaced by expansion deployment of the side airbag. Further, it is also possible to configure a side airbag device using a side airbag in which a chamber having a smaller capacity is arranged on the upper side and a chamber having a larger capacity is arranged on the lower side. Further, the side airbag device may have a structure of regulating the amount of gas flowing to the chamber of a larger capacity to thereby increase the amount of gas flowing to the chamber of a smaller capacity. Further, it is needless to say that the present invention is applicable to a side airbag device using a side airbag in which a particular chamber and the other chamber have the same capacity, or a side airbag device having three or more chambers.

What is claimed is:

1. A side airbag device for a vehicle, the device comprising:
    a seat provided in a vehicle interior of the vehicle;
    a side airbag having a plurality of chambers each folded, the side airbag being stored in a side portion of a seat back of the seat;
    an inflator arranged together with the side airbag, the inflator being capable of suppling gas to the plurality of chambers when a side-impact crash of the vehicle is detected;
    a channel section for distributing the gas generated from the inflator directly to each of the plurality of chambers;
    a valve unit provided in the channel section, the valve unit being capable of reducing a distributed amount of the gas flowing from the channel section to a particular chamber among the plurality of chambers; and
    an actuator unit that allows the valve unit to operate to reduce the distributed amount of the gas flowing from the channel section to the particular chamber according to deployment behavior of any chamber among the plurality of chambers.

2. A side airbag device for a vehicle comprising:
    a seat provided in a vehicle interior of the vehicle;
    a side airbag having a plurality of chambers each folded, the side airbag being stored in a side portion of a seat back of the seat;
    an inflator arranged together with the side airbag, the inflator being capable of suppling gas to the plurality of chambers when a side-impact crash of the vehicle is detected;

a channel section for distributing the gas generated from the inflator to the plurality of chambers;

a valve unit provided in the channel section, the valve unit being capable of reducing a distributed amount of the gas flowing from the channel section to a particular chamber among the plurality of chambers; and an actuator unit that allows the valve unit to operate to reduce the distributed amount of the gas flowing from the channel section to the particular chamber according to deployment behavior of any chamber among the plurality of chambers, wherein the valve unit is configured to include a valve body member capable of closing an outlet of the channel section opening to a side of the particular chamber, and the actuator unit is configured to include a cord-like member in which one end portion is connected with a circumference of another chamber other than the particular chamber, and another end portion is connected with the valve body member, the cord-like member being capable of displacing the valve body member to a closing side along with progress of deployment of the other chamber.

3. The side airbag device for the vehicle according to claim 2, wherein the circumference of the other chamber is folded in a tuck-folded and valley-folded manner, and the one end portion of the cord-like member is connected with the folded portion folded in the tuck-folded and valley-folded manner.

4. The side airbag device for the vehicle according to claim 3, wherein a capacity of the other chamber is the same as or larger than a capacity of the particular chamber.

5. The side airbag device for the vehicle according to claim 4, wherein the cord-like member is inserted into the channel section.

6. The side airbag device for the vehicle according to claim 3, wherein the cord-like member is inserted into the channel section.

7. The side airbag device for the vehicle according to claim 2, wherein a capacity of the other chamber is the same as or larger than a capacity of the particular chamber.

8. The side airbag device for the vehicle according to claim 7, wherein the cord-like member is inserted into the channel section.

9. The side airbag device for the vehicle according to claim 2, wherein the cord-like member is inserted into the channel section.

10. A side airbag device for a vehicle comprising:

a seat provided in a vehicle interior of the vehicle;

a side airbag having a plurality of chambers each folded, the side airbag being stored in a side portion of a seat back of the seat;

an inflator arranged together with the side airbag, the inflator being capable of suppling gas to the plurality of chambers when a side-impact crash of the vehicle is detected;

a channel section for distributing the gas generated from the inflator to the plurality of chambers;

a valve unit provided in the channel section, the valve unit being capable of reducing a distributed amount of the gas flowing from the channel section to a particular chamber among the plurality of chambers; and an actuator unit that allows the valve unit to operate to reduce the distributed amount of the gas flowing from the channel section to the particular chamber according to deployment behavior of any chamber among the plurality of chambers, wherein the valve unit is configured to include a throttle section capable of throttling an outlet of the channel section opening to a side of the particular chamber, and the actuator unit is configured to include a cord-like member in which one end portion is connected with the throttle section and another end portion is connected with a circumference of another chamber other than the particular chamber, the cord-like member being capable of displacing the throttle section to a throttling side along with progress of deployment of the other chamber.

11. The side airbag device for the vehicle according to claim 10, wherein the circumference of the other chamber is folded in a tuck-folded and valley-folded manner, and the one end portion of the cord-like member is connected with the folded portion folded in the tuck-folded and valley-folded manner.

12. The side airbag device for the vehicle according to claim 11, wherein a capacity of the other chamber is the same as or larger than a capacity of the particular chamber.

13. The side airbag device for the vehicle according to claim 12, wherein the cord-like member is inserted into the channel section.

14. The side airbag device for the vehicle according to claim 11, wherein the cord-like member is inserted into the channel section.

15. The side airbag device for the vehicle according to claim 10, wherein a capacity of the other chamber is the same as or larger than a capacity of the particular chamber.

16. The side airbag device for the vehicle according to claim 15, wherein the cord-like member is inserted into the channel section.

17. The side airbag device for the vehicle according to claim 10, wherein the cord-like member is inserted into the channel section.

* * * * *